K. A. SIMMON.
CONTROL SYSTEM.
APPLICATION FILED SEPT. 21, 1916.
1,338,333. Patented Apr. 27, 1920.
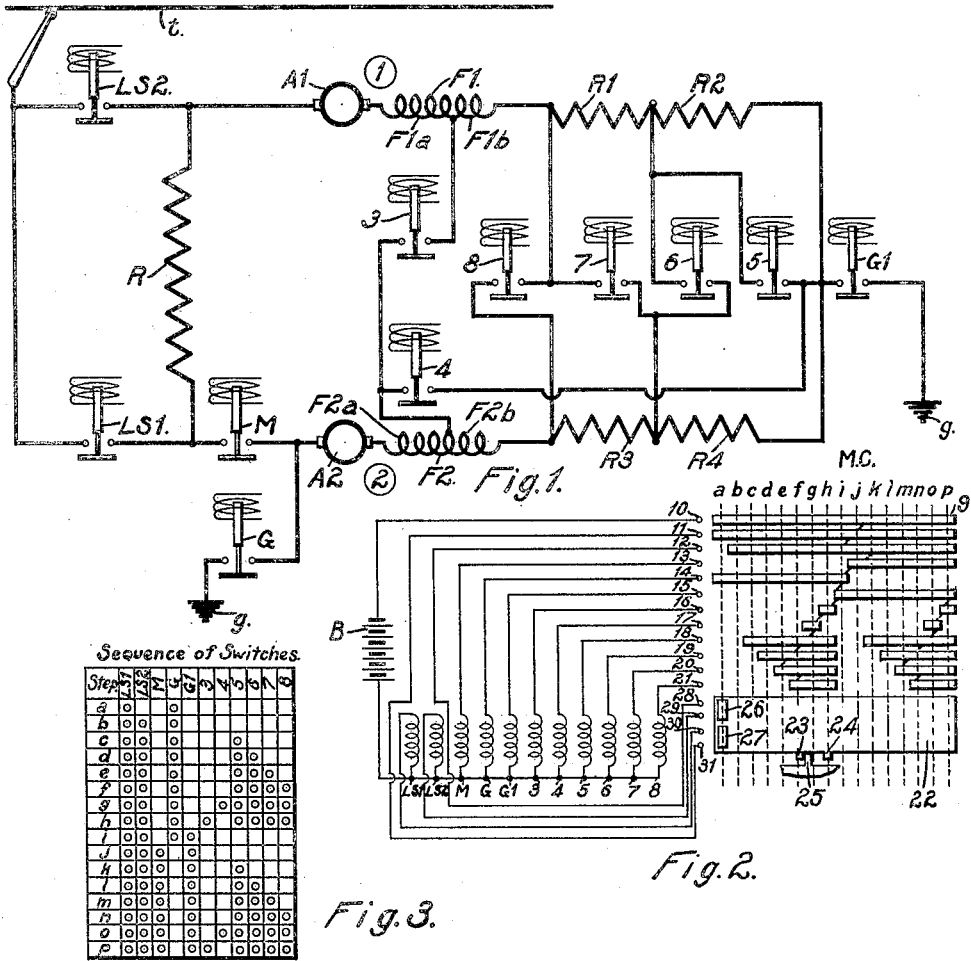

UNITED STATES PATENT OFFICE.

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,338,333.   Specification of Letters Patent.   Patented Apr. 27, 1920.

Application filed September 21, 1916. Serial No. 121,399.

*To all whom it may concern:*

Be it known that I, KARL A. SIMMON, a citizen of the United States, and a resident of Edgewood Park, in the county of Allegheny and State of Pennsylvania, have invented a new and useful Improvement in Control Systems, of which the following is a specification.

My invention relates to systems of control and particularly to systems of control for governing the propulsion of electric vehicles.

One object of my invention is to provide a system of control that is adapted to operate the motors contained therein through a number of resistance and field control positions, when the motors are connected in series and in parallel relation.

Another object of my invention is to provide a system of the above indicated character that shall be provided with means for reversing the current flow through a portion of the motors when the same are connected in parallel-circuit relation.

A further object of my invention is to provide a control system of the above indicated character that shall be provided with means for simultaneously breaking the individual branch circuits of the motors, in case the master controller be moved a short distance in a reverse direction when the motors are in parallel relation.

In the accompanying drawing illustrating my invention, Figure 1 is a diagrammatic view of a control system embodying my invention; Fig. 2 is a diagrammatic view of the auxiliary control circuits for operating the switches disclosed in Fig. 1; Fig. 3 is a sequence chart disclosing the sequence of operation of the switches in the various motor positions and Figs. 4, 5 and 6 are diagrammatic views of the circuits formed through the motors in the various positions of the master controller.

Referring to Fig. 1 of the drawing, a motor 1 comprising an armature A1 and a field winding F1 divided into portions F1$a$ and F1$b$ and a motor 2 comprising an armature A2 and a field winding F2 divided into portions F2$a$ and F2$b$, are adapted to be connected in series with resistors R, R1, R2, R3 and R4 across a supply circuit comprising conductors $t$ and $g$ and to be operated in series and in parallel relation by means of switches LS1, LS2, M, G, G1, 3, 4, 5, 6, 7 and 8.

A master controller MC, disclosed in Fig. 2 of the drawing and comprising a movable contact segment 9, is adapted to engage contact fingers 10 to 21, inclusive, when moved through positions $a$ to $p$, inclusive, and complete circuits from battery B through the coils of the switches LS1, LS2, M, G, G1, 3, 4, 5, 6, 7 and 8.

A ring 22 composed of insulating material and having projections 23 and 24 extending therefrom, is in frictional engagement with the drum of the master controller MC and is adapted to move with the master controller until one of the projections 23 and 24 engages a stationary projection 25. Two contact segments 26 and 27 are adapted to engage contact fingers 28, 29, 30 and 31 when the insulated ring 22 is moved, so that the projection 24 engages the stationary projection 25.

The operation of the system, when the master controller is moved through positions $a$ to $p$, inclusive, may be as follows: When the master controller is moved to position $a$, a circuit is completed from one terminal of the battery B, through contact fingers 10 and 11 which are bridged by the movable contact segment 9, contact fingers 31 and 30 which are bridged by the contact segment 27, and the coil of the switch LS1 to the other terminal of the battery B. A second circuit is completed from one terminal of the battery B, through the contact fingers 10 and 14, which are bridged by the movable contact segment 9, and the coil of the switch G to the other terminal of the battery B. The switches LS1 and G are operated and a circuit is completed which may be traced from the supply conductor $t$, through the switch LS1, resistor R, motor 1, resistors R1, R2, R4, R3, motor 2 and the switch G to the supply conductor $g$. The motors 1 and 2 are thus connected in series with the resistors R, R1, R2, R3 and R4 across the supply conductors $t$ and $g$, as illustrated in Fig. 4 of the drawing.

In positions *b* to *f*, inclusive, the contact segment 9 of the master controller MC successively engages contact fingers 12, 18, 19, 20 and 21 to operate the switches LS2, 5, 6, 7 and 8 and exclude the resistors R, R1, R2, R3 and R4 from the circuit of the motors.

The motors 1 and 2 may be further accelerated when they are in series relation, by excluding portions F1*b* and F2*b* of the field windings F1 and F2 from the circuit thereof. The field winding portions F1*b* and F2*b* are excluded from circuit, by means of switches 3 and 4 which are operated when the master controller is moved through positions *g* and *h*.

Between position *h* which is the last series position, and position *j* which is the first parallel position, is a transition position *i*. In the transition position *i* the switches 3, 5, 6, 7 and 8 are released and the switch G1 is operated to complete a circuit through the motors as illustrated in Fig. 5 of the drawing. In position *j* of the master controller, the switch G is released and the switch M is operated to connect the motors 1 and 2 in parallel relation, as illustrated in Fig. 6 of the drawing.

When the master controller is moved through positions *k* to *n*, inclusive, the switches 5, 6, 7 and 8 are successively operated to exclude the resistors R1 to R4, inclusive, from the circuit of the motors, and in positions *o* and *p* the motors are further accelerated by the switches 3 and 4 successively excluding field winding portions F1*b* and F2*b* from the circuit of the motors. In positions *i* and *j* it may be noted that the current flow through the motor 2 has been reversed by reason of the operation of the switch G1 and the release of the switch G.

In case the master controller MC be moved a relatively short distance in a reversed direction when in any parallel position, the ring 22 moves with the controller until the projection 23 engages the stationary projection 25. However, when the projection 23 engages projection 25 the contact segments 26 and 27 disengage the contact fingers 28 to 31, inclusive, whereby the circuits of the battery B through the coils of the switches LS1 and LS2 are broken and the switches LS1 and LS2 release to break all circuits through the motors 1 and 2.

I do not wish to be restricted to the specific circuit connections or location and arrangement of parts herein set forth, as various modifications thereof may be effected without departing from the spirit and scope of my invention I desire, therefore, that only such limitations shall be imposed as are indicated in the appended claims.

I claim as my invention:

1. In a system of control, the combination with a supply circuit, a plurality of motors having armature and field windings and means for operating the motors in series and in parallel-circuit relation and for effecting field control of the motors when connected in series and in parallel-circuit relation, of a line switch associated with each motor, and means responsive to the operation of the first-named means for simultaneously releasing said line switches at will to break all motor circuits when the motors are operating in parallel-circuit relation.

2. In a system of control, the combination with a supply circuit and two motors having armatures and field-magnet windings, of means comprising a controller member for accelerating said motors through a number of resistance and field control steps when connected in series and in parallel relation across the supply circuit, and for reversing the current flow through one of said motors when the motors are in parallel relation, and means actuated by said controller member for simultaneously breaking the parallel circuit of each of the motors when the latter are in parallel relation.

3. In a system of control, the combination with a supply circuit, a plurality of motors having armatures and divided field-magnet windings, and a plurality of resistors, of means for accelerating said motors through a number of resistance steps, means comprising a number of switches for effecting field control when the motors are in series and in parallel relation and means governed by the first-named means for simultaneously opening the parallel circuit of each motor when the motors are in parallel relation.

4. In a system of control, the combination with a supply circuit, two motors having armatures and divided field-magnet windings, and a plurality of resistors, of means comprising a controller for accelerating said motors through a number of resistance steps, means comprising said controller and two switches for effecting field control when the motors are in series and in parallel relation, and means comprising a switch inserted in the parallel branch circuit of each motor for simultaneously breaking the circuits of said motors when in parallel relation, in case the controller be moved a relatively short distance in a reverse direction.

5. In a system of control, the combination with two motors having armatures and field windings, and means comprising a controller for operating said motors in series and in parallel relation, of means for simultaneously opening the individual circuits of said motors in case said controller be moved a relatively short distance in a reverse direction when the motors are in parallel relation.

6. In a system of control, the combination with two motors having armatures and field windings, means comprising a controller for operating said motors in series and in parallel relation, and means for accelerating the motors through a number of resistance steps and for effecting field control when the motors are in series and in parallel relation, of means for simultaneously opening the parallel branch circuit of each motor in case said controller be moved a relatively short distance in a reverse direction when the motors are in parallel relation.

In testimony whereof, I have hereunto subscribed my name this 7th day of Sept. 1916.

KARL A. SIMMON.